United States Patent
Tanzer et al.

[19]

[11] Patent Number: 6,095,005
[45] Date of Patent: Aug. 1, 2000

[54] AXLE DRIVETRAIN HAVING SPEED REDUCTION GEAR UNIT FOR AUTOMOTIVE VEHICLES

[75] Inventors: John H. Tanzer, Punta Gorda, Fla.; Tim Howard, Hamburg; Binod Kumar Agrawal, Rochester Hills, both of Mich.

[73] Assignee: Ford Motor Company, Dearborn, Mich.

[21] Appl. No.: 09/173,379

[22] Filed: Oct. 15, 1998

[51] Int. Cl.⁷ .................................................. B60K 17/04
[52] U.S. Cl. ............................. 74/390; 475/225; 180/371
[58] Field of Search .................................... 475/221, 225; 74/390; 180/371, 375, 376

[56] References Cited

U.S. PATENT DOCUMENTS

| | | | |
|---|---|---|---|
| 1,504,033 | 8/1924 | Edwards | 74/390 |
| 1,544,439 | 6/1925 | Fielder | 74/390 |
| 1,780,922 | 11/1930 | Howe | 74/390 |
| 1,824,793 | 9/1931 | Riise | 74/390 |
| 3,150,531 | 9/1964 | Singer | 74/390 |
| 3,862,667 | 1/1975 | Wolansky | 180/371 X |
| 4,249,631 | 2/1981 | Huneke | 180/255 |
| 4,315,556 | 2/1982 | Timoney | 180/255 |
| 4,860,843 | 8/1989 | Baltensperger | 180/373 |

OTHER PUBLICATIONS

1996 Hummer Parks Catalog, 6–24 Wheels And Tires/Axles/Central Tire Inflation System, AM General Corporation.

*Primary Examiner*—Sherry L. Estremsky
*Attorney, Agent, or Firm*—Frank G. McKenzie

[57] ABSTRACT

A differential mechanism, connected to a driveshaft, transmits power to two halfshafts laterally directed toward the driven wheels of a motor vehicle. Each halfshaft is driveably connected to a pinion, which continually engages a gear fixed to an axle shaft, the pinion and gear forming a speed reduction gearset located between the halfshaft and axle shaft. Each gearset is located in a drop gear housing. Opposite axial ends of each halfshaft are fixed to a differential housing and the drop gear housing. Two extension tubes, each press fitted in the differential housing and a corresponding drop gear housing, provide structural continuity therebetween.

4 Claims, 5 Drawing Sheets

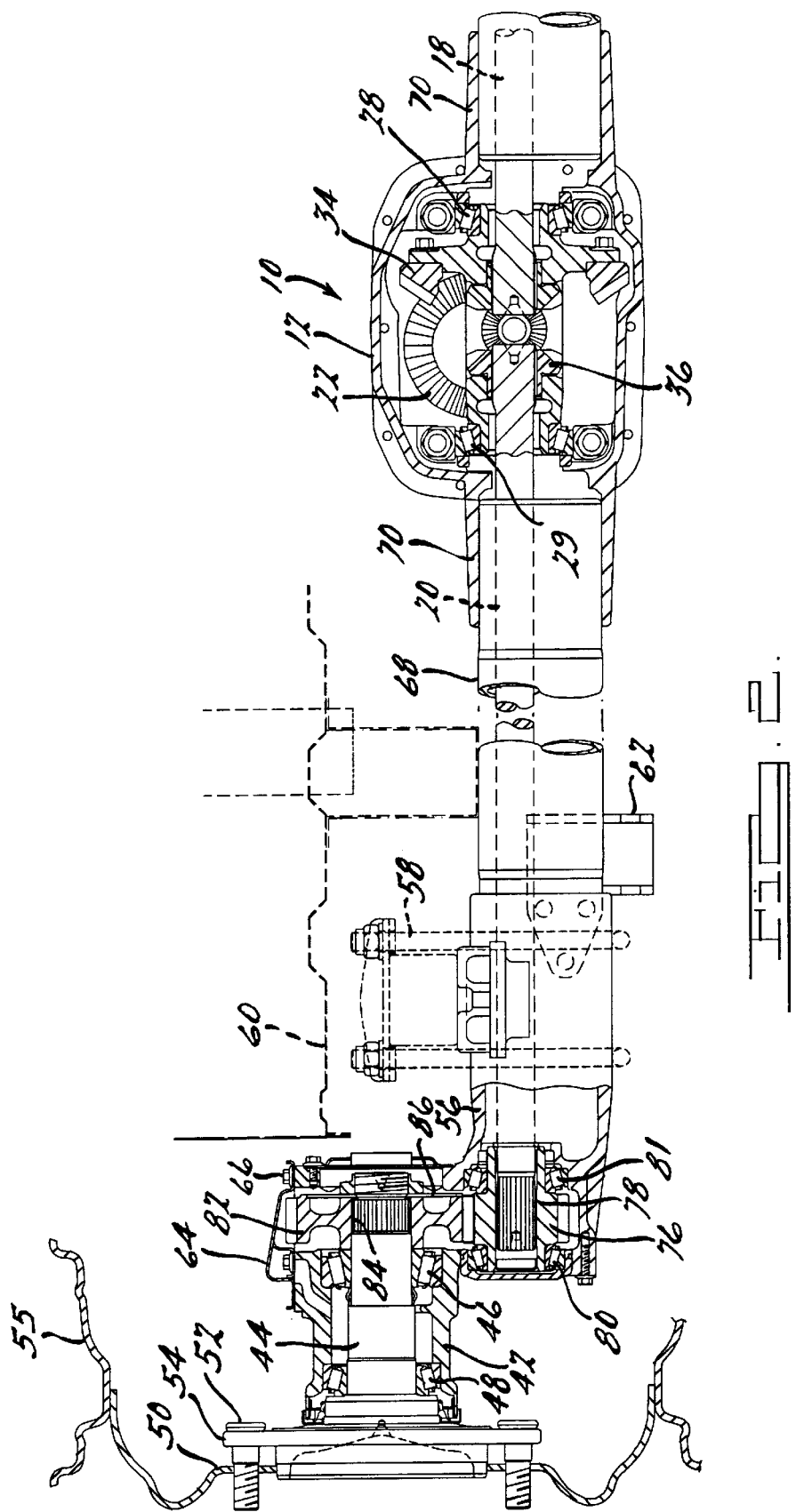

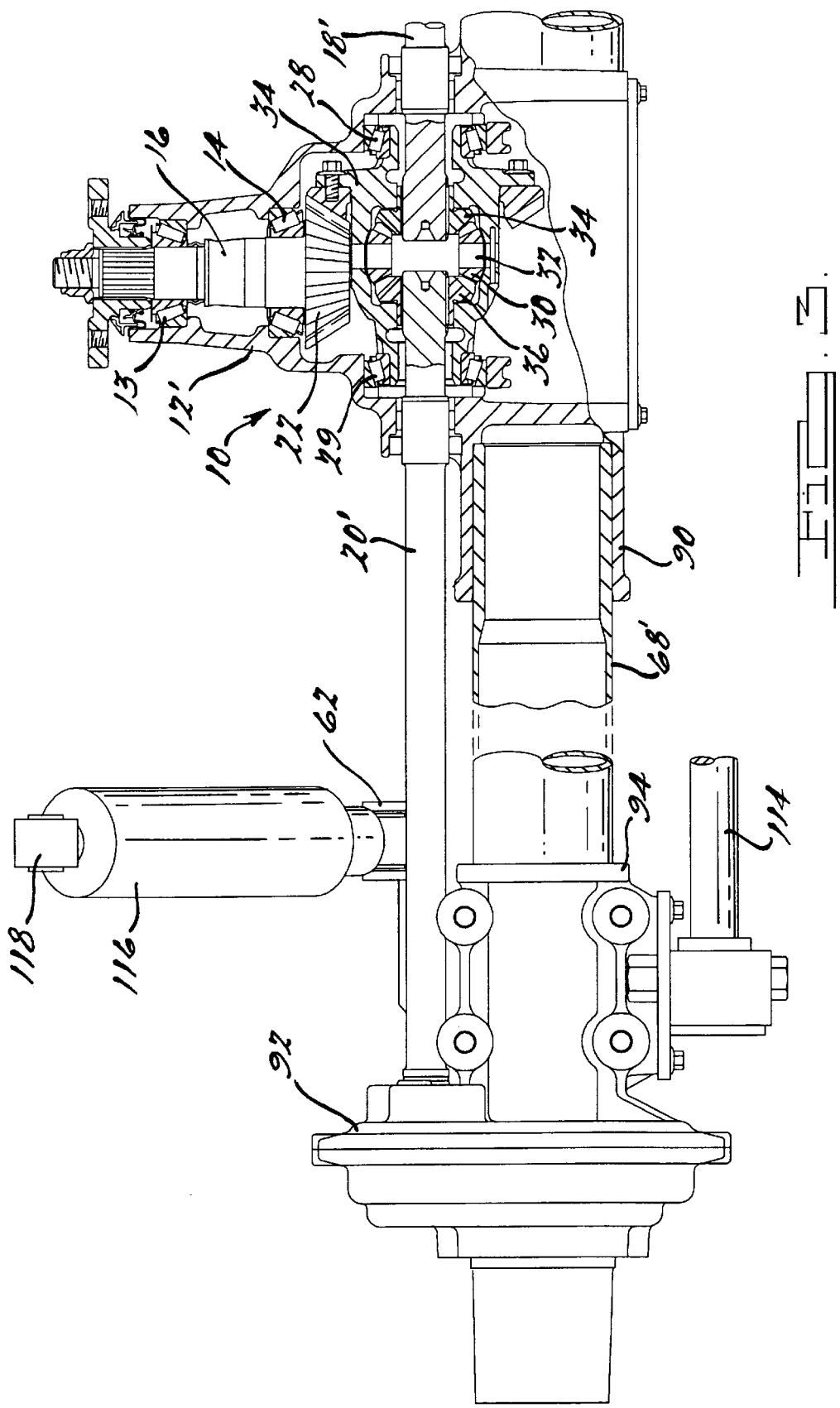

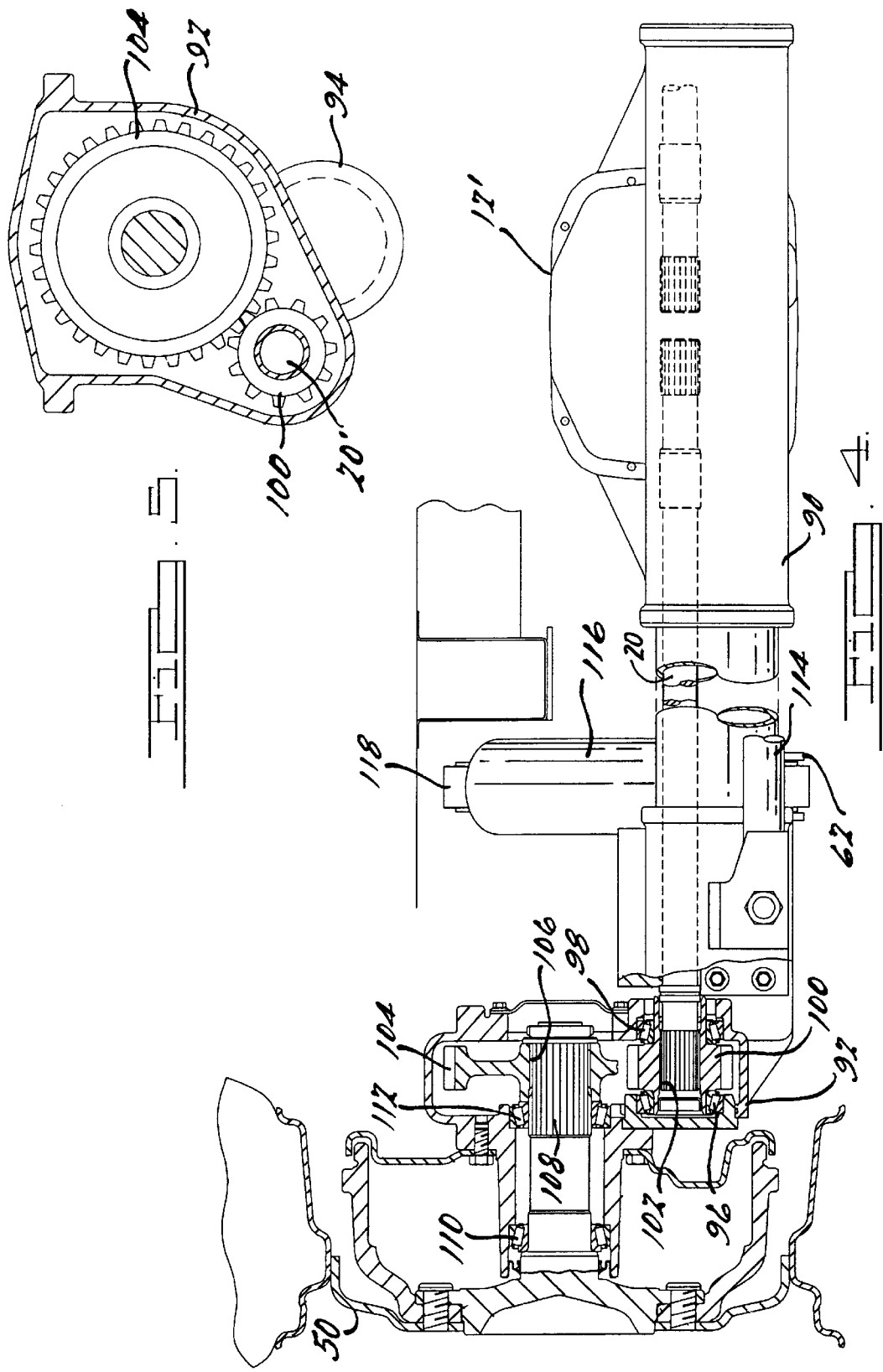

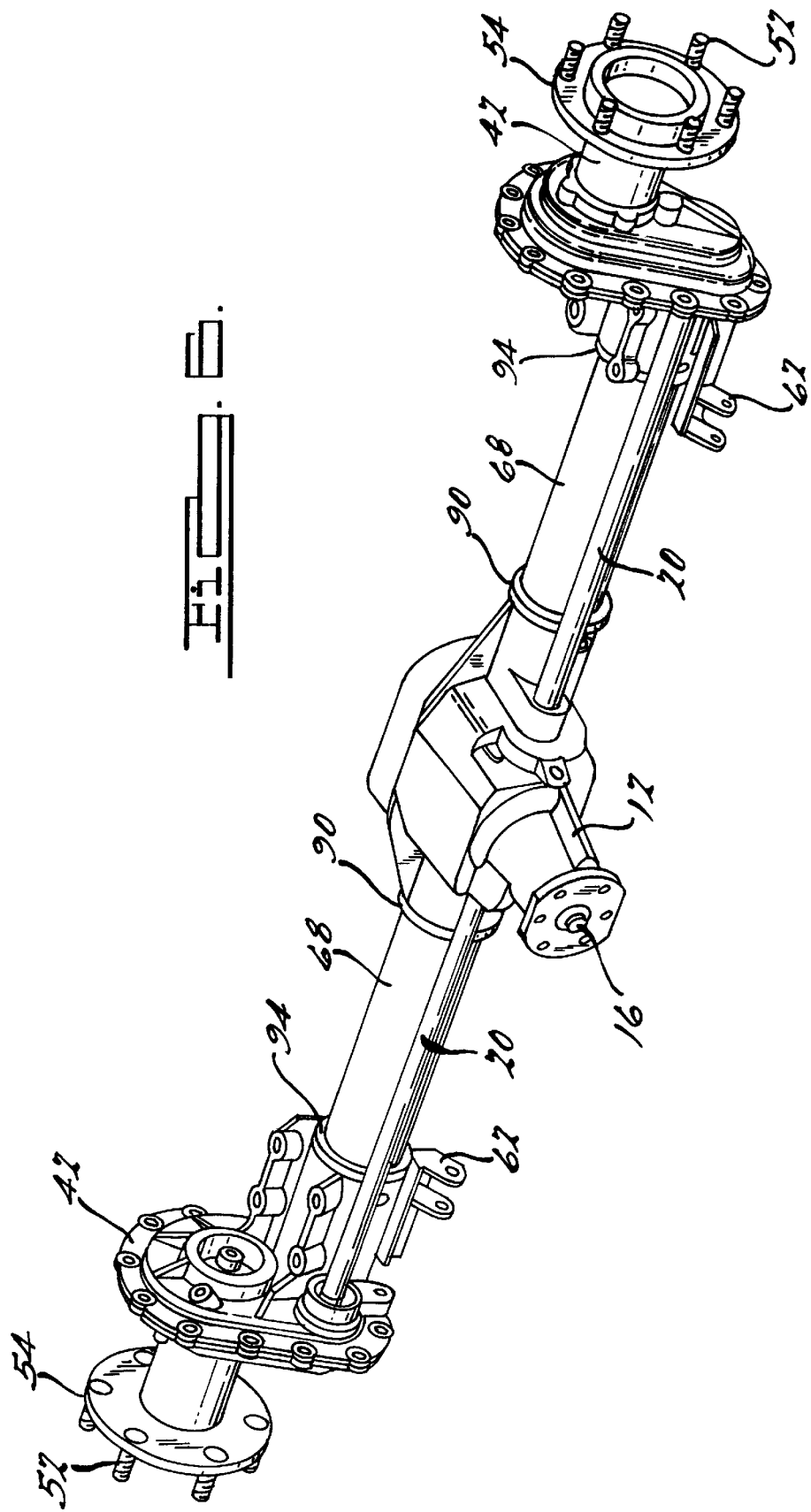

6,095,005

1

AXLE DRIVETRAIN HAVING SPEED REDUCTION GEAR UNIT FOR AUTOMOTIVE VEHICLES

BACKGROUND OF THE INVENTION

1. Field of the Invention

This invention relates to a drivetrain for an automotive vehicle, more particularly to a drivetrain having an axle differential mechanism and a speed reduction gearset located at each driven wheel.

2. Description of the Prior Art

Various drivelines having a speed reduction gearset at each driven wheel of a motor vehicle have been employed for different purposes. For example, U.S. Pat. No. 4,860,843 describes a driveline for a tractor, in which the rear wheels are supported on a U-shaped frame having legs extending rearward. Power developed by an engine is transferred through a differential mechanism located forward of the axle shafts from a differential mechanism through right-hand and left-hand chain drive mechanisms rearward to the vicinity of the driven wheels. The chain drive mechanisms each drive a simple speed reduction gearset whose output is driveably connected to the corresponding axle shaft. This arrangement of the power flow provides a free space between the legs of the U-shaped frame between the rear wheels so that auxiliary units can be readily coupled to the frame of the tractor.

U.S. Pat. No. 4,315,556 describes a hub reduction gear unit located in the hub of the vehicle, the gear unit being in the form an epicyclic gear train.

U.S. Pat. No. 4,249,631 describes a drive axle for steerable wheels, the axle pivotally mounted on the frame of the motor vehicle having two drive shafts angled mutually in a V-shaped configuration opening downward and rearward to increase the distance between the axle housing and the ground.

In another application of a speed reduction gearset located at the wheel hub, the gearset is used to raise the distance between the ground level and the frame of the motor vehicle in order to facilitate ground clearance for off-road use of the vehicle.

SUMMARY OF THE INVENTION

It is an object of this invention to provide a low profile speed reduction gearset at each wheel of a driven axle pair in a drivetrain for a motor vehicle. It is another object to reduce the height of the floor onto which a load must be raised and the volume or storage capacity of a cargo box for use in a commercial vehicle such as a delivery van.

An advantage of this invention is the ability to provide a wide range of wheel-gear reduction requirements while eliminating the need and cost for multiple unique optional axle and transmission gear ratio combinations.

In realizing these and other objects and advantages a drivetrain for transmitting power between an engine and driven wheels of a motor vehicle, includes a driveshaft extending longitudinally and driveably connected to an engine; first and second halfshafts, each having a first axis of rotation directed laterally with respect to the driveshaft; a differential mechanism driveably connected to the driveshaft and the first and second halfshafts; axleshafts having a second axis of rotation substantially parallel to the first halfshaft and spaced vertically upward therefrom; and gearsets each driveably connected to a halfshaft and a corresponding axleshaft for reducing the angular speed of the axleshaft relative to speed the halfshaft.

2

Figure 1:
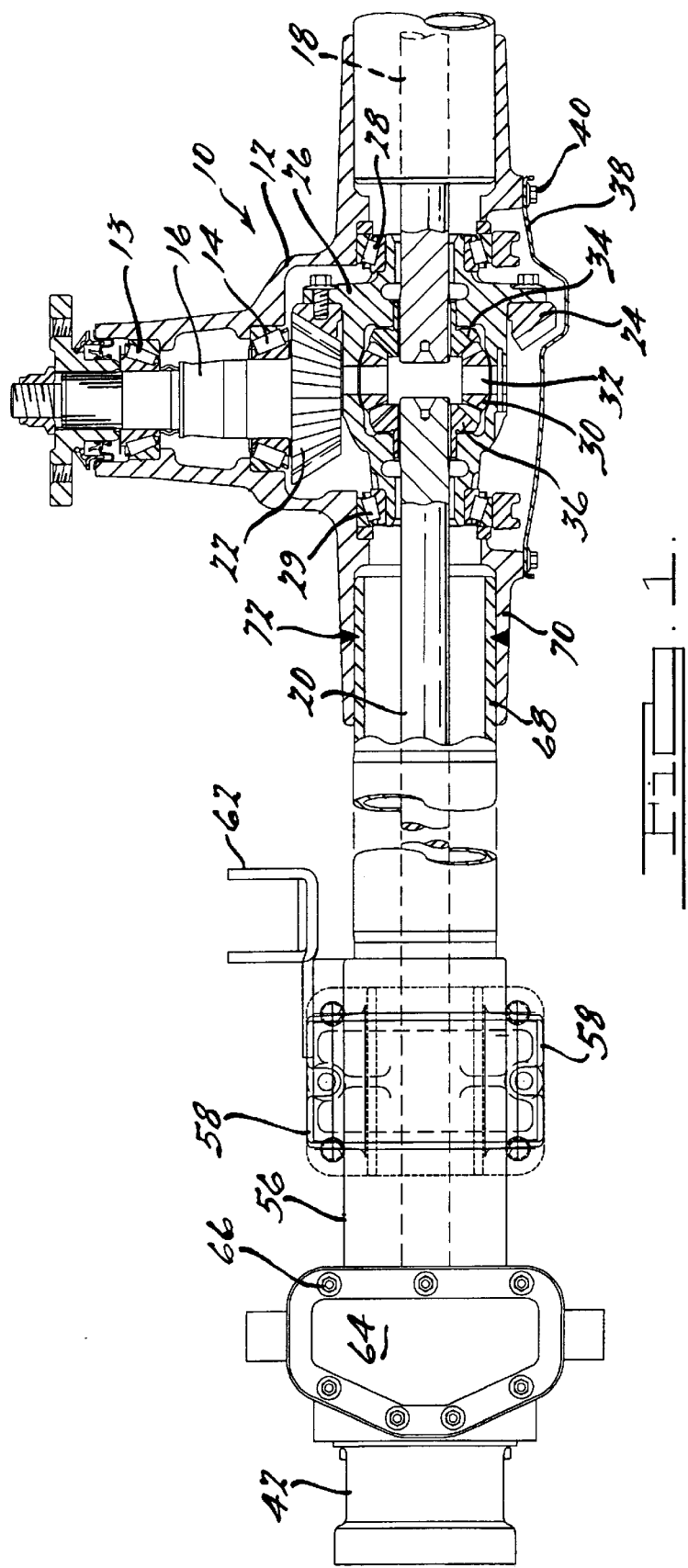
FIG. 1 is a cross section through a horizontal plane showing a portion of the driveline according to the present invention.

FIG. 2 is a cross section taken at a vertical plane through the driveline of FIG. 1.

FIG. 3 is a cross section through a horizontal plane showing a portion of the drivetrain of an alternate embodiment according to the present invention.

FIG. 4 is a partial cross section taken at a vertical plane through the driveline of FIG. 3.

FIG. 5 is a side view of the drivetrain of FIGS. 3 and 4.

FIG. 6 is a perspective view of a driveline assembly according to this invention.

DESCRIPTION OF THE PREFERRED EMBODIMENT

Referring first to FIGS. 1 and 2, a differential mechanism 10 located between the driven wheels of motor vehicle is located within a differential housing 12, preferably formed of nodular cast iron. Supported within the housing on tapered thrust roller bearings 13, 14 is a driveshaft 16, directed along the length of the motor vehicle and adapted to transmit power to right-hand and left-hand halfshafts 18, 20, respectively. Driveshaft 16 carries a bevel pinion 22 in continuous meshing engagement with a ring gear 24, which is bolted to differential carrier 26. The carrier is supported rotatably on the housing 12 by way of tapered roller thrust bearings 28, 29. Carrier 26 supports multiple differential bevel pinions 30 on pins 32, the pinions being in continuous meshing engagement with side bevel gears 34, 36, which are joined by splines to axle shafts 18, 20, respectively. Preferably the input gears of the axle mechanism are Hypoid gears. The components located within housing 12 are installed from the rear through an opening closed by a cover 38 fixed to the housing by bolts 40.

Located at the outer end of each halfshaft is a driven wheel 50 and an integral drop-gear housing 42, which supports an axle shaft 44 on tapered roller thrust bearings 46, 48. Axle shaft 44, preferably a forging, provides a surface against which the wheel 50 is held by lug nuts, engaged with lug bolts 52 spaced angularly about the axis of the wheel and fitted in holes through a flange 54 formed integrally with the axle shaft. Formed integrally with housing 42 is a laterally extending sleeve 56 which carries on its outer surface a spring hanger suspension support 58, on which leaf springs that support a cargo box are fixed. Housing 42 also carries a shock absorber mounting 62, to which one end of a shock absorber assembly is fixed. Local access to the interior of drop gear housing 42 is provided by removing a cover 64 secured to the housing by bolts 66. The floor 60 of the cargo box is shown extending into the space provided between housings 12 and 42 above halfshaft 20.

An extension tube 68, preferably in the form of a right circular cylindrical tube, directed laterally between the differential housing 12 and the drop gear housing 42, is inserted within the laterally directed sleeve portion 70 of housing 12, and the sleeve portion 56 of housing 42. Preferably tube 68 is fitted within sleeves 70 and 56 with a press fit and a permanent connection is made by a plug weld 72 between sleeve 70 and tube 68.

The left-hand halfshaft 20 extends laterally from the differential housing within extension tube 68 and into housing 42. A pinion 76, driveably connected at a spline 78 to the laterally outer end of halfshaft 20, is supported in housing 42 on tapered roller thrust bearings 80, 81. Pinion 76 is in continual meshing engagement with gear 82, which is fixed to the left-hand axle shaft 44 at a spline connection 84. Preferably the teeth of pinion 76 and gear 82 are high contact ratio teeth, either helical or spur gear teeth.

A wheel speed sensor disc 86, having radially directed recesses spaced angularly about the axis of axle shaft 44 and separated by raised bosses, is fixed to the axle shaft. A wheel speed sensor, preferably a Hall-effect sensor mounted adjacent wheel 86, produces an electrical signal representing the speed of the vehicle.

Referring next to FIGS. 3–5, an alternate form of the differential housing 12' contains a differential mechanism that is substantially the same as that described above with respect to FIGS. 1 and 2. However, halfshaft 20' is not located within the extension tube 68', but instead is located forward and substantially parallel to the axis of extension tube 68'. Housing 12' includes a sleeve portion 90 into which extension tube 68' is press fitted, and drop-gear housing 92 includes sleeve portion 94 into which the extension tube is press fitted.

The outboard end of halfshaft 20' extends into drop gear housing 92, where it is supported on bearings 96, 98, and is driveably connected to a pinion 100 by a spline 102. Pinion 100 is in continuous meshing engagement with gear 104, which is driveably connected by a spline 106 to an axle shaft 103, which support the wheel 50 at bearings 110, 112 fitted in housing 92. FIG. 5 shows the relative positions of the extension tube sleeve 94, pinion 100 and gear 104, 108. This offset arrangement of the halfshaft from the axis of the extension tube permits an increased center distance between the gear and mating pinion, thereby providing multiple gear ratio options and additional load carrying capacity of the gearset.

A transverse link arm 114 for use in a Watts suspension has one axial end fixed to housing 92. A shock absorber 116 has one axial end fixed by mounting 62 to housing 92 and the opposite end 118 fixed to the vehicle chassis.

FIG. 4 shows housing 92 as a single piece that extends axially inboard of bearing 110 and outboard to the outer end of sleeve portion 94. The housing 92 includes an upper opening closed by a cover 120 attached to the housing by bolts and a outboard opening closed by a bolted cover 122. The upper opening permits installation of the bearings 110, 112 and gear 104; the outboard opening permits installation of the bearings 96, 98 and pinion 100. FIG. 3 shows housing 92' formed of inboard housing portion 124 and an outboard housing portion 126 mutually connected at a bolt circle that encircles the housing portions.

The low profile-double reduction rear axle in combination with a reduced size differential mechanism permits lowering the vertical position of the cargo floor 60 by about four inches compared to the cargo floor position required if a full size differential mechanism were used without the speed reduction gearset located at each axle shaft.

The design and arrangement of the wheel-end gear reduction assemblies provides appropriate wheel brake and suspension mounting. In addition, the wheel and gear reduction design makes simple interchangeability of the gearset and axle ratios possible, thereby reducing the complexity and cost of a significant number of transmission and axle options while meeting overall gear reduction requirements.

Although the form of the invention shown and described here constitutes the preferred embodiment of the invention, it is not intended to illustrate all possible forms of the invention. Words used here are words of description rather than of limitation. Various changes in the form of the invention may be made without departing from the spirit and scope of the invention as disclosed.

We claim:

1. A driveline for transmitting power in a motor vehicle, comprising:

first and second halfshafts, each halfshaft having a first axis of rotation directed laterally toward a driven wheel of the vehicle;

a differential housing containing a differential mechanism driveably connected to the halfshafts;

first and second axleshafts, each axleshaft having a second axis of rotation substantially parallel to the first axis and spaced vertically upward therefrom;

a first gearset driveably connected to the first halfshaft and first axleshaft for reducing the angular speed of the first axleshaft relative to the speed the first halfshaft; and a second gearset driveably connected to the second halfshaft and second axleshaft for reducing the angular speed of the second axleshaft relative to the speed the second halfshaft;

a first gear housing spaced laterally from the differential housing, adapted to support the first axleshaft rotatably and the first halfshaft rotatably, the first gear housing containing the first gearset;

a second gear housing spaced laterally from the differential housing, adapted to support the second axleshaft rotatable and the second halfshaft rotatably, the second gear housing containing the second gearset;

a first extension tube fixed to the differential housing and first gear housing, the first halfshaft located forward of, and directed substantially parallel to the first extension tube;

second extension tube fixed to the differential housing and second gear housing, the second halfshaft located forward of, and directed substantially parallel to the second extension tube;

suspension supports, each support fixed to one of the gear housings;

a cargo box supported on the suspension supports, having a floor located vertically above the halfshafts.

2. The driveline of claim 1, wherein the first halfshaft is located within and extends along the first extension tube; and the second halfshaft is located within and extends along the second extension tube.

3. A drivetrain for transmitting power in a motor vehicle, comprising:

a halfshaft having a first axis of rotation directed laterally toward a driven wheel of the vehicle;

a differential housing containing a differential mechanism driveably connected to the halfshaft;

an axleshaft having a second axis of rotation substantially parallel to the first axis and spaced vertically upward therefrom;

a gear housing spaced laterally from the differential housing, adapted to support the axleshaft and halfshaft rotatably, the gear housing containing a gearset including a pinion driveably connected to the halfshaft and a gear driveably connected to the axleshaft, for reducing the angular speed of the axleshaft relative to the speed the halfshaft; and an extension tube fixed to the differential housing and gear housing, wherein the halfshaft is located forward of, and is directed substantially parallel to the extension tube.

4. The drivetrain of claim 3 further comprising an extension tube fixed to the differential housing and gear housing, wherein the halfshaft is located within, and extends along the extension tube.

* * * * *